United States Patent
Ni et al.

(10) Patent No.: US 7,576,990 B2
(45) Date of Patent: Aug. 18, 2009

(54) THIN HARD DRIVE WITH 2-PIECE-CASING AND GROUND PIN STANDOFF TO REDUCE ESD DAMAGE TO STACKED PCBA'S

(75) Inventors: Jim Chin-Nan Ni, San Jose, CA (US); Charles C. Lee, Cupertino, CA (US); Abraham C. Ma, Fremont, CA (US); Ming-Shiang Shen, Taipei Hsien (TW)

(73) Assignee: Super Talent Electronics, Inc., San Jose, CA (US)

( * ) Notice: Subject to any disclaimer, the term of this patent is extended or adjusted under 35 U.S.C. 154(b) by 259 days.

(21) Appl. No.: 11/683,292

(22) Filed: Mar. 7, 2007

(65) Prior Publication Data

US 2007/0183209 A1    Aug. 9, 2007

Related U.S. Application Data

(63) Continuation-in-part of application No. 11/309,843, filed on Oct. 11, 2006, and a continuation-in-part of application No. 10/990,887, filed on Nov. 16, 2004, now Pat. No. 7,301,776, and a continuation-in-part of application No. 09/478,720, filed on Jan. 6, 2000, now Pat. No. 7,257,714.

(51) Int. Cl.
*H05K 1/14* (2006.01)
(52) U.S. Cl. ...................... 361/737; 361/715
(58) Field of Classification Search ............... 174/52.2; 361/737, 600, 715; 439/76.1, 946
See application file for complete search history.

(56) References Cited

U.S. PATENT DOCUMENTS

| | | | | |
|---|---|---|---|---|
| 5,339,222 A | * | 8/1994 | Simmons et al. ............ 361/818 |
| 5,710,693 A | * | 1/1998 | Tsukada et al. ............. 361/686 |
| 5,896,274 A | * | 4/1999 | Ishida ......................... 361/737 |
| 5,946,714 A | * | 8/1999 | Miyauchi ..................... 711/205 |
| 5,991,197 A | * | 11/1999 | Ogura et al. ........... 365/185.11 |
| 6,460,111 B1 | * | 10/2002 | Shinohara ................... 711/103 |
| 6,493,233 B1 | | 12/2002 | De Lorenzo et al. |
| 7,034,223 B2 | | 4/2006 | Fan et al. |
| 7,113,392 B2 | | 9/2006 | Lu et al. |
| 2005/0164532 A1 | | 7/2005 | Ni et al. |
| 2006/0041783 A1 | | 2/2006 | Rabinovitz |
| 2006/0228910 A1 | | 10/2006 | Nishizawa et al. |
| 2007/0274032 A1 | * | 11/2007 | Ni et al. ...................... 361/684 |

* cited by examiner

*Primary Examiner*—Hung S Bui
(74) *Attorney, Agent, or Firm*—Stuart T. Auvinen; g Patent LLC

(57) ABSTRACT

A case-grounded flash-memory drive has a printed-circuit board assembly (PCBA) with flash-memory chips and a controller chip. The PCBA is encased inside an upper case and a lower case, with a Serial AT-Attachment (SATA) connector that fits through and opening between the cases. The cases can be assembled with the PCBA by a snap-together, ultrasonic-press, screw-fastener, or thermal-bond adhesive method. Dual-axis case-grounding pins draw any electro-static-discharges (ESD) current off the upper case along a primary axis and onto a PCBA ground through a secondary axis washer that is screwed into the PCBA. The primary axis body of the dual-axis case-grounding pins fits around a PCBA notch while the secondary axis passes through a metalized alignment hole for grounding. When the SATA connector is inserted into a host, the host ground sinks ESD currents collected by the dual-axis case-grounding pins.

19 Claims, 19 Drawing Sheets

STACKED-PCBA'S SNAP-COUPLED METHOD

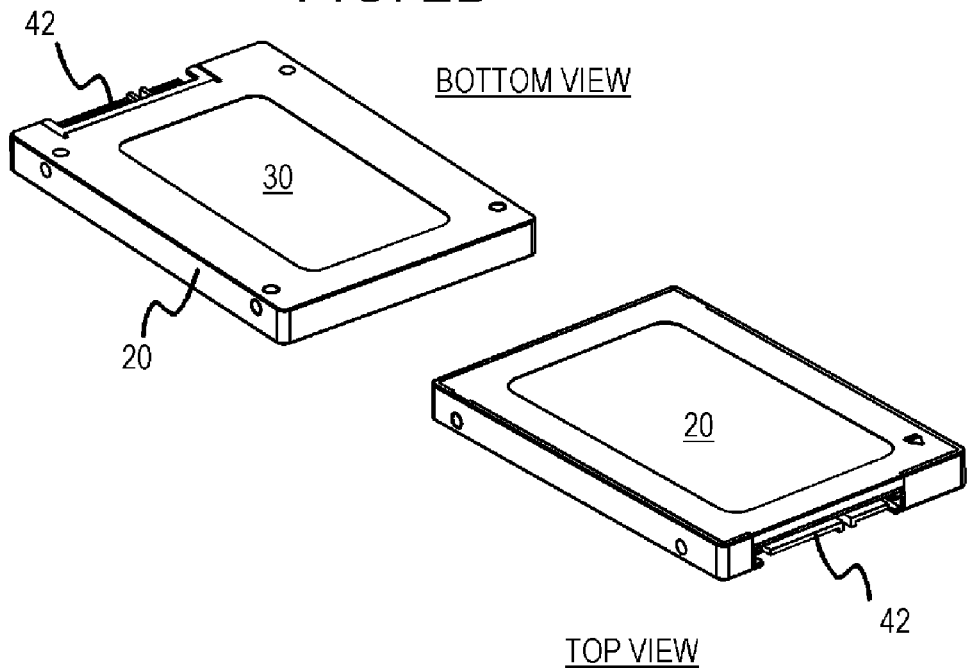

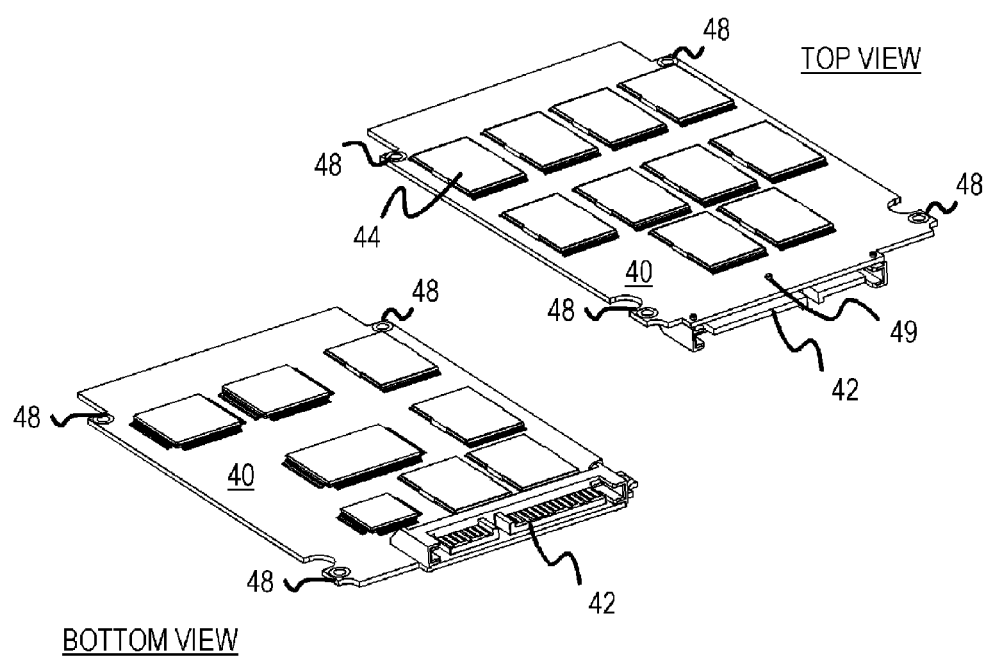

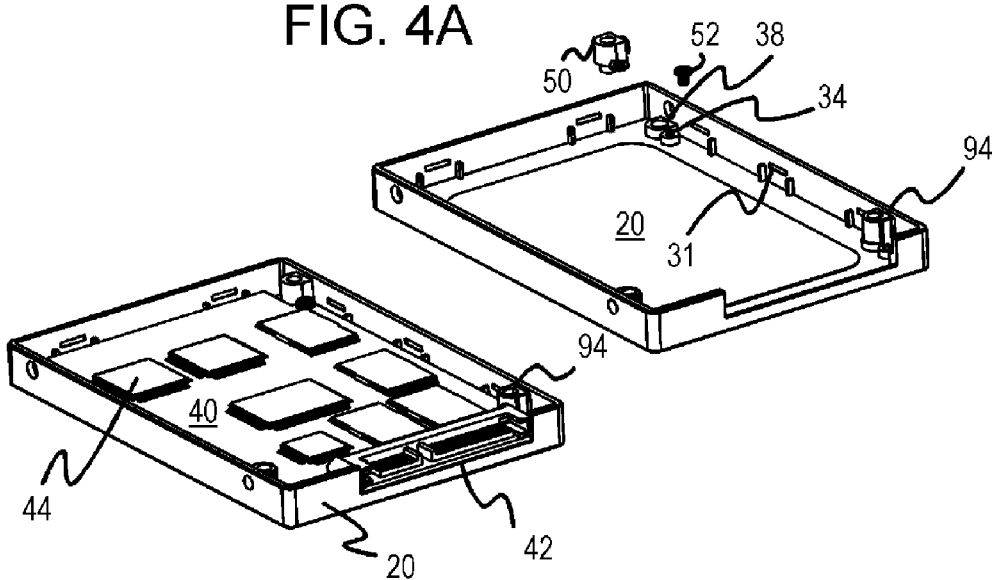

SINGLE-PCBA, ULTRASONIC BOND METHOD

SINGLE-PCBA, ULTRASONIC BOND METHOD
FIG. 5B
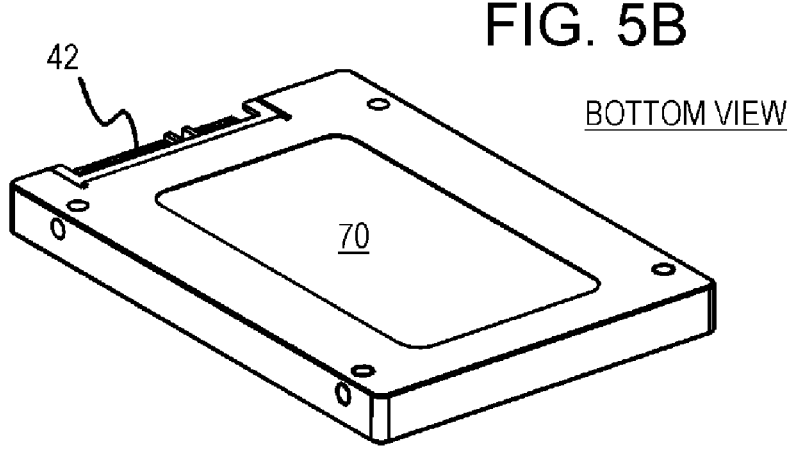
BOTTOM VIEW
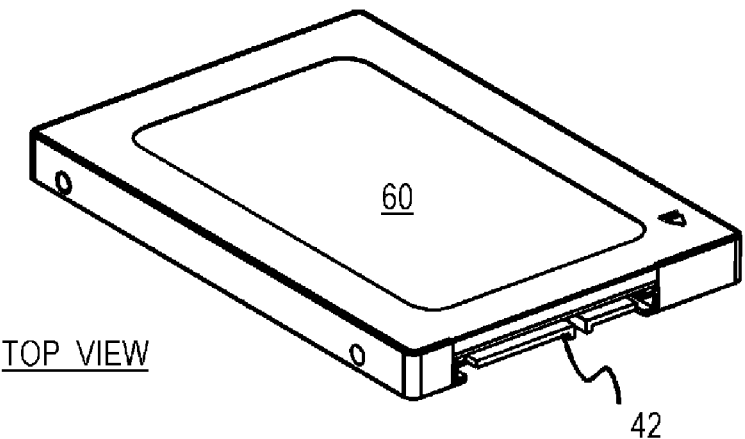
TOP VIEW
FIG. 5C STACKED-PCBA'S, SNAP-COUPLED METHOD
FIG. 6B
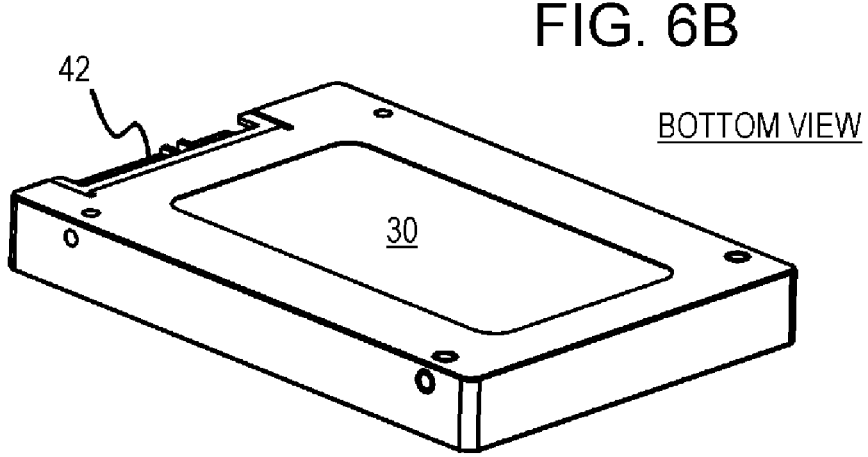
BOTTOM VIEW
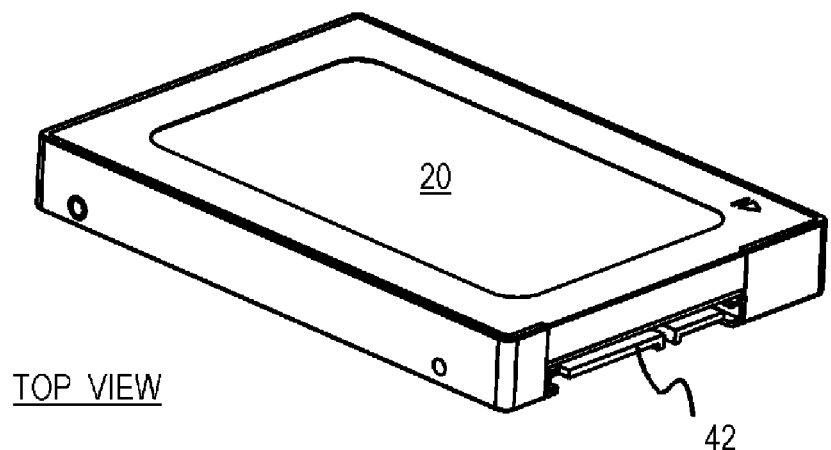
TOP VIEW
FIG. 6C

STACKED-PCBA'S

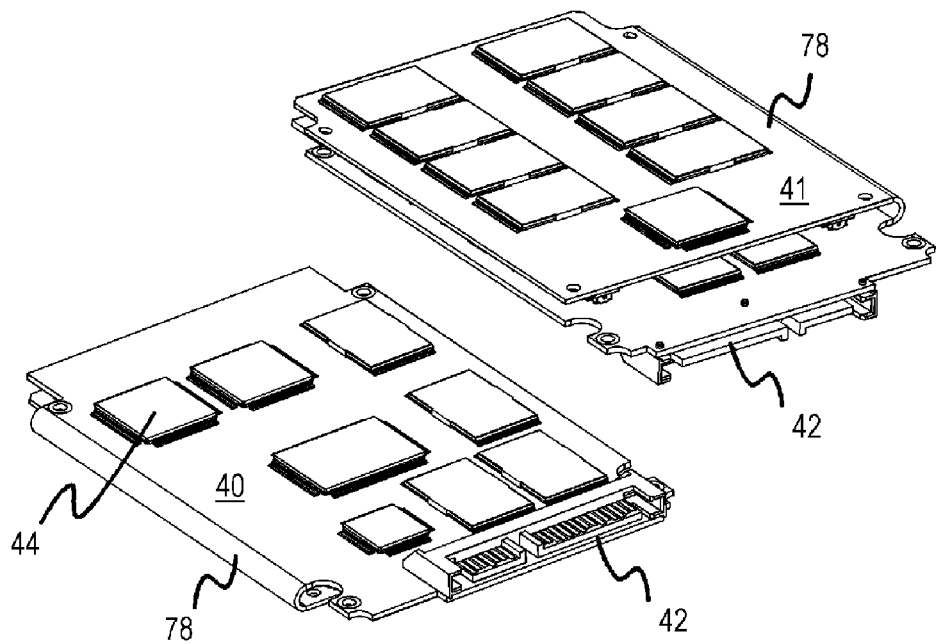
BOTTOM VIEW  FIG. 8B
FIG. 8C  TOP VIEW

SINGLE-PCBA,THERMAL-BOND FILM METHOD

SINGLE-PCBA, THERMAL-BONDFILM METHOD

SINGLE-PCBA,SCREW METHOD

THIN HARD DRIVE WITH 2-PIECE-CASING AND GROUND PIN STANDOFF TO REDUCE ESD DAMAGE TO STACKED PCBA'S

RELATED APPLICATION

This application is a continuation-in-part (CIP) of the co-pending applications for "Thin Flash-Hard-Drive with Two-Piece Casing", U.S. Ser. No. 11/309,843, filed Oct. 11, 2006, "Light-Weight Flash Hard Drive With Plastic Frame", U.S. Ser. No. 10/990,887, filed Nov. 16, 2004, and "Electronic Data Storage Medium with Fingerprint Verification Capability", U.S. Ser. No. 09/478,720, filed Jan. 6, 2000.

FIELD OF THE INVENTION

This invention relates to flash-memory hard drives, and more particularly to manufacturing a flash drive with a two-piece casing, grounded standoff, and dual printed-circuit boards (PCBs).

BACKGROUND OF THE INVENTION

Solid-state flash-disk devices use flash memory for storage rather than rotating disks. Eliminating the rotating disks and mechanical devices greatly improves reliability and shock resistance. However, these solid-state devices may be more prone to damage from tiny electrical shocks or electro-static-discharge (ESD).

Flash memory chips use electrically-erasable programmable read-only memory cells (EEPROM) that can only be read or written in blocks. The blocks are typically 512 bytes or larger. In contrast to block-addressable flash memory, static random-access memory (SRAM) and dynamic-random-access memory (DRAM) are usually byte-addressable or word-addressable, where words are 4 or 8 bytes.

The parent application disclosed an electronic data storage medium that had fingerprint verification capability. FIG. 1 is a schematic circuit block diagram illustrating an electronic data storage medium disclosed in the parent application.

The electronic data storage medium with fingerprint verification capability can be accessed by external computer 9 using input/output interface circuit 5, which may use a Personal-Computer Memory Card International Association (PCMCIA), RS-232, or similar interface to communicate. The electronic data storage medium can be located inside or outside of the external computer.

The electronic data storage medium with fingerprint verification capability is packaged in card body 1, and includes processing unit 2, memory device 3, fingerprint sensor 4, input/output interface circuit 5, display unit 6, power source 7, and function key set 8.

Memory device 3 can be a flash memory device that stores data files. Fingerprint sensor 4 scans a fingerprint of a user to generate fingerprint scan data. Processing unit 2 connects to other components and can operate in various modes, such as a programming mode, a data retrieving mode, and a data resetting mode. Power source 7 supplies electrical power to processing unit 2. Function key set 8 allows the user to input a password that is verified by processing unit 2. Display unit 6 shows the operating status of the electronic data storage medium.

The electronic data storage medium may be a subset of the electronic data storage medium with fingerprint verification capability. The electronic data storage medium is packaged in card body 1, and includes processing unit 2, memory device 3, and input/output interface circuit 5. While such an electronic data storage medium is useful, manufacturing methods and product designs are desired that can be cost-effectively produced. In particular, designs for making the card body or casing that encapsulates the electronic components are desired. To reduce the cost and size, designs of the electronic data storage medium that eliminate some costly components, such as the fingerprint sensor, function key set, and display, are desirable. An external power source may further reduce costs and size. Such device designs can allow a low-cost electronic data storage medium to be manufactured.

What is desired is a solid-state flash-drive device that has improved electro-static-discharge (ESD) protection. A grounded flash-drive is desired.

BRIEF DESCRIPTION OF THE DRAWINGS

FIG. 2B shows a bottom view of the finished flash drive made with the snap-together process.

FIG. 2C shows a top view of the finished flash drive made with the snap-together process.

FIGS. 3A-B shows a top view and a bottom view of a printed-circuit board assembly (PCBA).

FIGS. 4A-D show enlargement views of the dual-axis case-grounding pin fitting into the upper case.

FIGS. 5A-C show a case-grounded flash-drive device made using an ultrasonic bonding method.

FIGS. 6A-C show a flash-drive device made with snap-together process that has two PCBA's and dual-axis case-grounding pins.

FIGS. 8B-C show flexible circuit boards used to form and connect dual PCBAs.

DETAILED DESCRIPTION

The present invention relates to an improvement in manufacturing ESD-hardened flash-drive devices. The following description is presented to enable one of ordinary skill in the art to make and use the invention as provided in the context of a particular application and its requirements. Various modifications to the preferred embodiment will be apparent to those with skill in the art, and the general principles defined herein may be applied to other embodiments. Therefore, the present invention is not intended to be limited to the particular embodiments shown and described, but is to be accorded the widest scope consistent with the principles and novel features herein disclosed.

The inventors have realized that while flash drives are more reliable than rotating hard disks, flash drives may suffer from reliability problems from electro-static-discharges (ESD). Especially as integrated circuit (IC) feature sizes continue to shrink to produce higher memory densities, the susceptibility to ESD damage increases.

The inventors further realize that ESD susceptibility can be reduced by improved design and manufacturing methods. ESD damage can occur when a user touches the case when the device is plugged into a host, even when the device has a plastic case. Grounding the plastic case to the ground on the device can allow ESD currents to be dissipated through the ground an be directed away from the leads to sensitive IC devices such as flash-memory chips and controllers.

Grounding is problematic with plastic-encased flash drives, since there is little or not metal in the case to ground the PCB to. The inventors add a case-grounding pin between the plastic case and the PCB to sink small ESD currents applied to the plastic case by a user. Although the plastic case is an insulator, some plastics may still conduct small currents. When the flash-drive device is plugged into a host, the ESD currents applied to the plastic case can be shunted through the case-grounding pin to the PCB ground, and then through a connector to the host and the host's chassis ground.

The case-grounding pin has two axes—a primary axis which most of the metal for grounding is centered around, and a secondary axis that acts as a conducting washer that is screwed to the PCB to make electrical contact to the PSB ground. The metal around the primary axis acts as additional ground metal, increasing the ground capacitance, and able to sink small ESD currents that might otherwise damage IC's on the PCB. The secondary axis makes electrical connection to the PCB ground. Since the primary axis is offset from the secondary axis, a larger piece of metal may be provided around the primary axis, increasing the size of the metal ground sink and increasing its effectiveness.

Figure 2A:
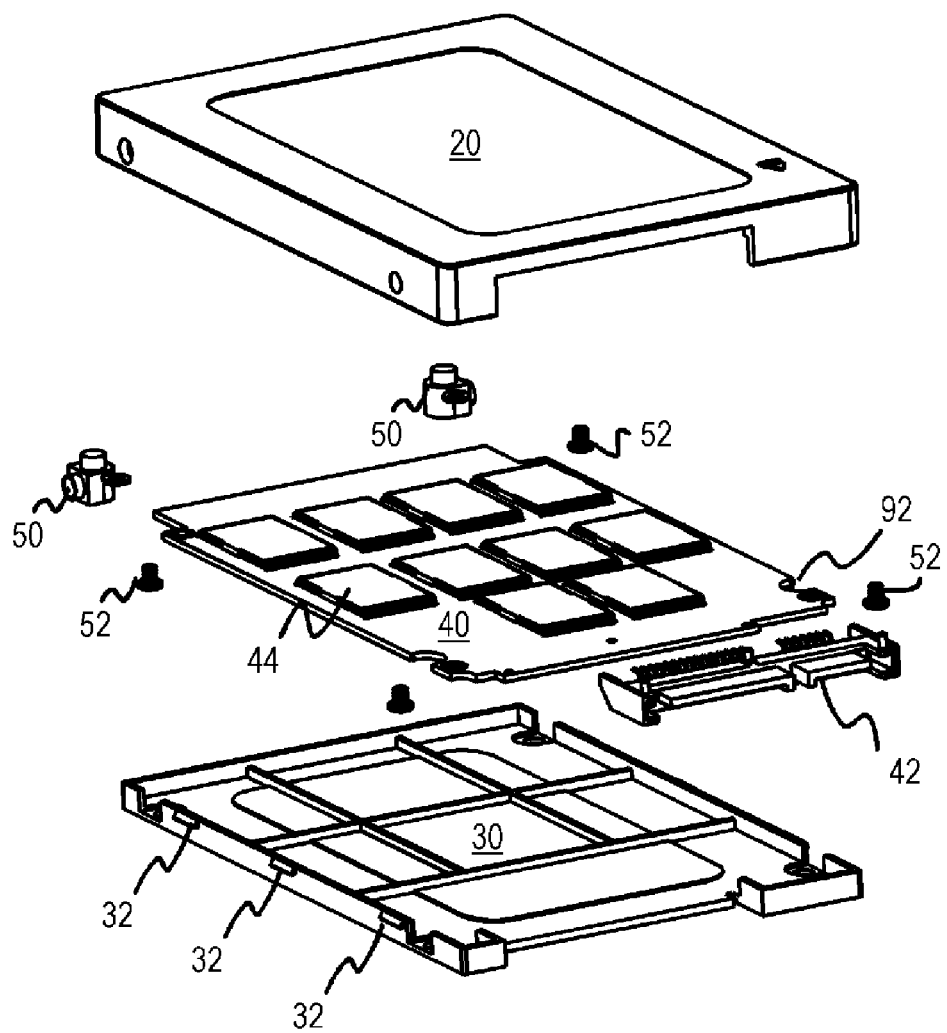
FIG. 2A is a parts view of a flash drive with case-grounding pins.

FIG. 2A is a parts view of a flash drive with case-grounding pins. Printed-circuit board assembly PCBA 40 is a circuit board that has chips 44 and other components such as capacitors and resistors mounted on one or both sides. Chips 44 include flash-memory chips and a controller chip. Connector 42 is soldered to metal pads on PCBA 40 to form a sub-assembly. Connector 42 is a Serial AT-Attachment (SATA) connector that can connect to a personal computer (PC) or other host.

Upper case 20 and lower case 30 are formed of plastic, such as by extrusion, molding, stamping, or other processes. Snaps 32 in lower case 30 fit into slots (not shown) inside upper case 20 to snap together lower cover 30 into upper cover 20 to encase PCBA 40. Before snapping cases 20, 30 together, PCBA is fitted into upper case 20 and fits against plastic standoff pedestals formed inside upper case 20.

The secondary axis of dual-axis case-grounding pins 50 is aligned with the alignment holes of PCBA 40 after PCBA 40 is fitted inside upper case 20, and the primary axis of dual-axis case-grounding pins 50 fits into a case-grounding pin recess formed inside upper case 30.

Two screws 52 are fitted through the secondary axis of dual-axis case-grounding pins 50 and then through alignment holes in PCBA 40. Another two screws 52 are fitted into the front two alignment holes of PCBA 40, but do not fit through any dual-axis case-grounding pins 50, since in this embodiment there are no dual-axis case-grounding pins 50 in the front, but only 2 in the back of the device. All four screws 52 are screwed through PCBA 40 and into screw holes that are formed inside upper case 20. The screw holes are in the middle of plastic standoff pedestals inside upper case 20. Notches 92 near the front alignment holes in PCBA 40 can fit around taller plastic alignment pedestals formed inside upper case 20 next to the plastic standoff pedestals that screws 52 fit into. Finally lower case 30 is fitted into upper case 20 and snaps 32 into slots in upper case 20 to encapsulate PCBA 40.

FIG. 2B shows a bottom view of the finished flash drive made with the snap-together process. Bottom case 30 is visible inside upper case 20, with connector 42 protruding out the front of the device.

FIG. 2C shows a top view of the finished flash drive made with the snap-together process. Upper case 20 surrounds bottom case 30, which is not visible. Connector 42 protrudes out the front of the device.

FIG. 3A shows a top view and FIG. 3B shows a bottom view of a printed-circuit board assembly (PCBA). PCBA 40 is a printed circuit board that has chips 44 mounted on both sides. Chips 44 include several flash-memory chips and one or more controller chips or interface chips. Near the four corners of PCBA 40 are alignment holes 48 that are surrounded by a trace ring of metal that is connected by traces or vias to the ground of PCBA 40. When screws 52 or dual-axis case-grounding pins 50 are placed over alignment holes 48, they make electrical contact with the metal trace rings and electrically connect to the PCBA ground.

Connector 42 has metal pads (not shown) that are soldered to matching metal trace pads on PCBA 40 to make electrical connection for the SATA interface to the host. Plastic alignment tabs or pins formed in connector 42 fit into one or more connector alignment holes 49 formed in PCBA 40 during sub-assembly.

Figure 4C:
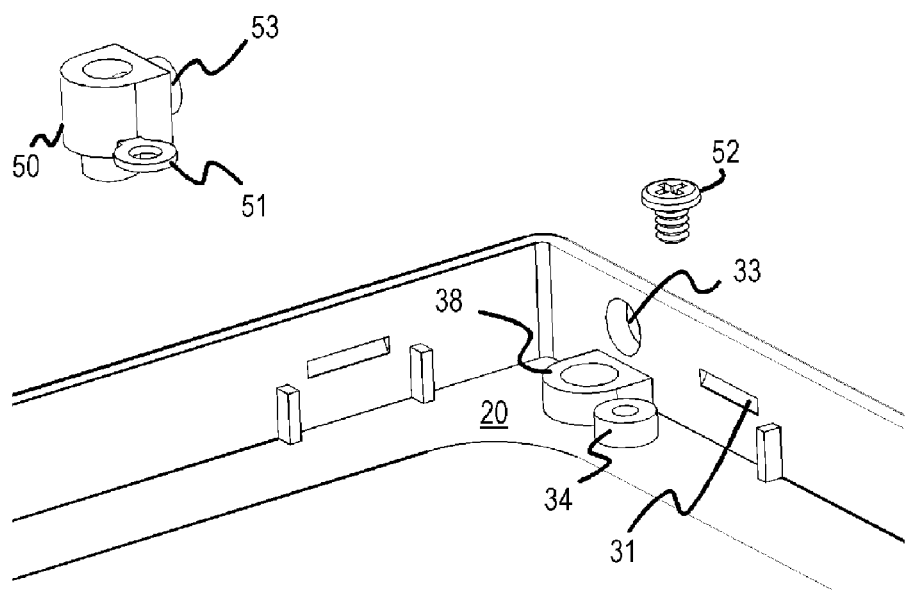

FIGS. 4A-D show enlargement views of the dual-axis case-grounding pin fitting into the upper case. In FIG. 4A, slots 31 formed inside upper case 20 are for receiving snaps 32 of lower case 30 (FIG. 2A). When PCBA 40 is fitted into upper case 20, the lower surface of PCBA 40 rests on top of two plastic standoff pedestals 34 that are located next to case-grounding pin recesses 38. The bottom of dual-axis case-grounding pins 50 fits into case-grounding pin recess 38 after PCBA 40 is installed.

PCBA 40 has corner notches on all four corners. The back two notches fit around the two dual-axis case-grounding pins 50, while the front two notches fit around two alignment tabs 94 that are formed in upper case 20. Thus the position of PCBA 40 within upper case 20 is aligned by circuit-board notches that fit around two alignment tab 94 and around two dual-axis case-grounding pins 50. PCBA 40 is slid about one-half to three-fourths of the way down alignment tab 94 and dual-axis case-grounding pins 50. FIG. 4B shows PCBA 40 installed inside upper case 20.

FIG. 4C shows an greater enlargement of dual-axis case-grounding pin 50 and case-grounding pin recess 38. Dual-axis case-grounding pins 50 has a primary axis that is vertically oriented in FIG. 4C. A cylindrical tab on the bottom of dual-axis case-grounding pins 50 on this primary axis fits into a hole in case-grounding pin recess 38. Cutout tab 53 which extends out the back of dual-axis case-grounding pins 50 and is perpendicular to the primary axis snaps into cutout hole 33, which is formed in the side of upper case 20.

The secondary axis of dual-axis case-grounding pins 50 is parallel to the primary axis, and is also vertical in FIG. 4C. The secondary axis passes through the center of secondary axis washer 51. Secondary axis washer 51 is an extension of dual-axis case-grounding pins 50 that resembles a washer for a bolt or screw. When dual-axis case-grounding pins 50 is installed into case-grounding pin recess 38, the primary axis of dual-axis case-grounding pins 50 passes through the center of case-grounding pin recess 38, while the secondary axis passes vertically through secondary axis washer 51 and plastic standoff pedestals 34.

Dual-axis case-grounding pin 50 is installed after PCBA 40 is installed into upper case 20. The cutout notch in PCBA 40 allows the cylindrical tab on the bottom of dual-axis case-grounding pins 50 on this primary axis to fit into case-grounding pin recess 38, but the notch ends between case-grounding pin recess 38 and plastic standoff pedestals 34. Thus PCBA 40 fits between plastic standoff pedestals 34 and secondary axis washer 51.

Figure 4D:
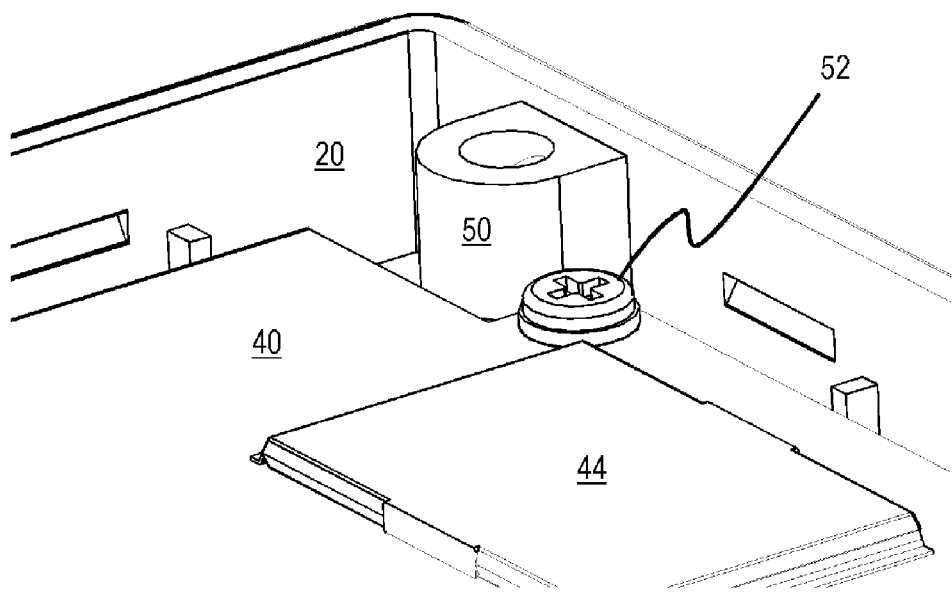

Screw 52 is fitted into secondary axis washer 51 along the secondary axis. Screw 52 is screwed down through secondary axis washer 51, alignment hole 48 (FIG. 3A) in PCBA 40, and plastic standoff pedestals 34. Screw 52 tightens secondary axis washer 51 against alignment holes 48 on PCBA 40 and against plastic standoff pedestals 34 in upper case 20. FIG. 4D shows the assembly after secondary axis washer 51 on dual-axis case-grounding pin 50 has been screwed into upper case 20.

Since there is a metal trace ring around alignment holes 48 on PCBA 40 that is connected by traces or vias to the ground on PCBA 40, secondary axis washer 51 is grounded when screwed together to PCBA 40. Traces on PCBA 40 connect the internal ground to a ground pin on connector 42, so that when the flash-drive device is inserted into a host connector, connector 42 connects the ground on PCBA 40 to the host ground. Dual-axis case-grounding pins 50 and secondary axis washer 51 can be made from a single molded or machined piece of conducting metal, such as a copper alloy, aluminum alloy, al-cu alloy, etc. to provide good conduction.

Electric shocks applied by a user when handling upper case 20 or lower case 30 are transmitted through dual-axis case-grounding pins 50 and secondary axis washer 51, through trace metal around alignment hole 48 and traces on PCBA 40 to the ground of PCBA 40, then through a ground signal on connector 42 to the host ground, which may be connected to a chassis ground. Thus ESD shocks are carried away through dual-axis case-grounding pins 50 to the chassis ground, protecting chips 44 on PCBA 40.

Figure 5A:
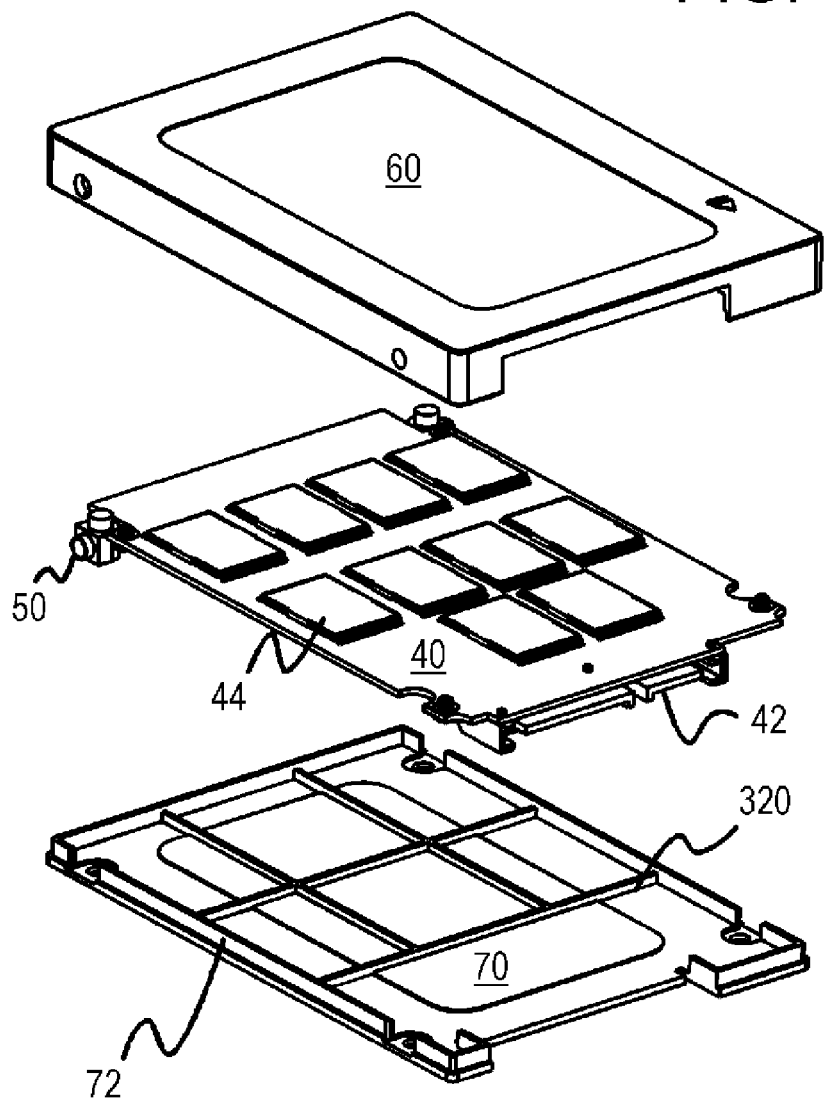

FIGS. 5A-C show a case-grounded flash-drive device made using an ultrasonic bonding method. The inside of upper case 60 fits around ultrasonic bonder edges 72 on lower case 70. Ridges 320 on lower case 70 can provide more stiffness to lower case 70 and could even provide support to the bottom of PCBA 40. Dual-axis case-grounding pins 50 are fitted into upper case 60 after PCBA 40 is fitted into upper case 60 in a similar manner to that described in FIG. 4. However, rather than use snaps and slots in the upper and lower cases, upper case 60 is bonded to lower case 70 using ultrasonic energy. When upper case 60 is fitted over lower case 70, upper case 60 makes contact with ultrasonic bonder edges 72. Ultrasonic vibrations of upper case 60 relative to lower case 70 cause friction on ultrasonic bonder edges 72. This friction heats the plastic on ultrasonic bonder edges 72 and on the inside edges of upper case 60, causing local melting of the plastic, which bonds ultrasonic bonder edges 72 to upper case 70.

Dual-axis case-grounding pins 50 and PCBA 40 can be screwed into upper case 60 as described before using 4 screws (not shown), or could be fitted into holes in case-grounding pin recess 38 in upper case 60 without screws, when a good electrical contact may be made between trace rings on PCBA 40 and secondary axis washer 51, such as by applying vertical pressure during ultrasonic bonding.

FIGS. 5B, 5C shown the final flash-drive device after assembly and ultrasonic bonding. Even though upper case 60 and lower case 70 are plastic, any electric ESD shocks that reach the inside of the case are carried by dual-axis case-grounding pins 50 to the PCBA ground, and out the ground signal on connector 42 to a host ground.

Figure 6A:
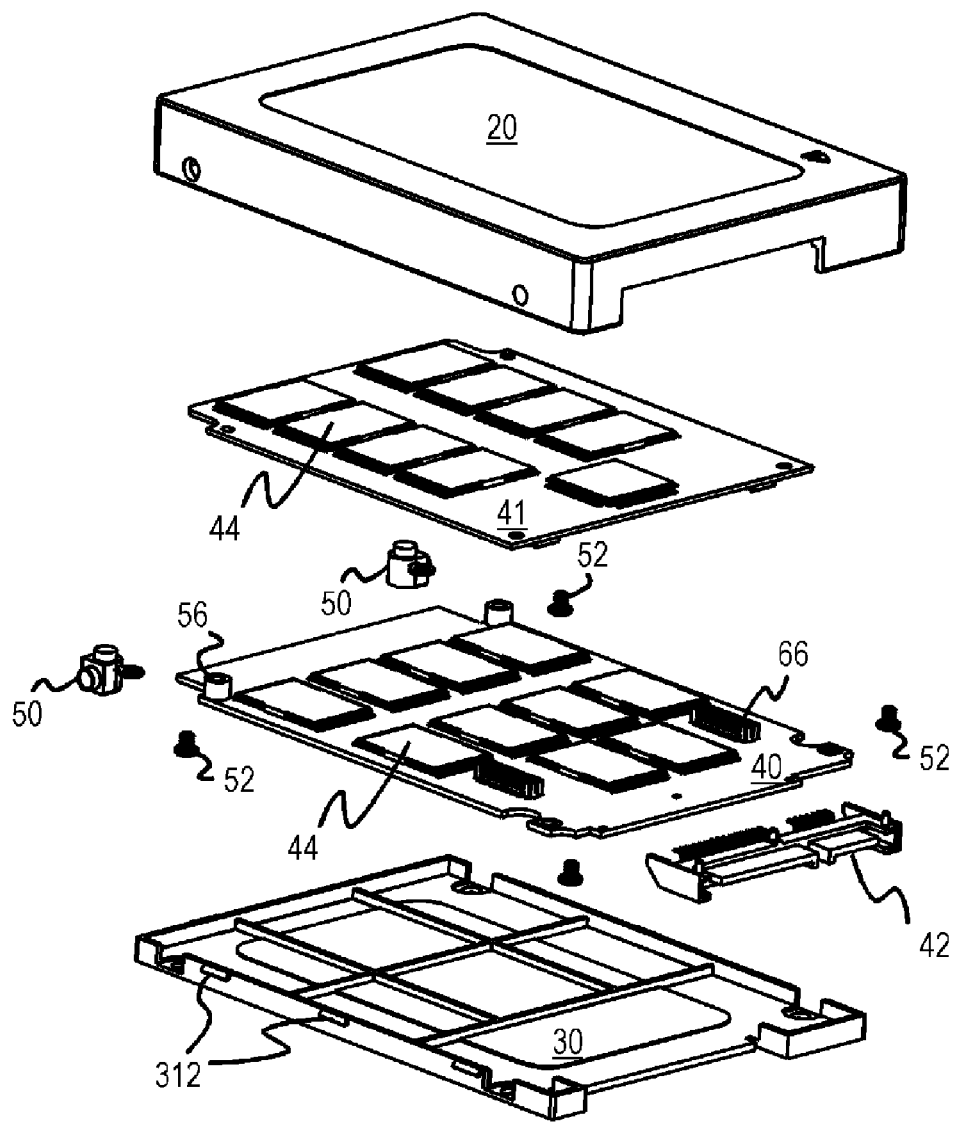

FIGS. 6A-C show a flash-drive device made with snap-together process that has two PCBA's and dual-axis case-grounding pins. Rather than have a single PCB, two circuit boards may be placed in parallel inside the flash-drive device to increase the memory capacity or functionality.

Second or upper PCBA 41 has additional chips 44 mounted on it, such as additional flash-memory chips for greater memory capacity. Dual-axis case-grounding pins 50 fit around notches on the back of both PCBA 41 and PCBA 40. Standoffs 56 fit between PCBA 40, 41 to provide sufficient spacing between the circuit boards. Standoffs 56 can be cylindrical rings of metal or plastic that are aligned to the secondary axis and fit around screws 52. The length of screws 52 can be increased so that screws 52 fit through alignment holes in both of PCBA 40, 41 and into plastic standoff pedestals inside upper case 20.

Two socket connectors 66 on the top surface of PCBA 40 receive matching pins on a connector (not shown) on the bottom surface of PCBA 41. Socket connectors 66 carry signals, ground, and power between PCBA 40, 41, and also provide spacing between PCBA 40, 41 near the front of the device.

Snaps 312 in lower case 30 fit into slots (not shown) in upper case 20 to connect the cases together and encapsulated PCBA 40, 41. Dual-axis case-grounding pins 50 connect to lower PCBA 40 but not to upper PCBA 41. This provides a more direct ground connection to connector 42, since connector 42 is soldered to lower PCBA 40 rather than upper PCBA 41.

FIGS. 6B-C shown the final assembled flash-drive devices. The thickness of upper case 20 can be increased to allow room for second PCBA 41.

Figure 7A:
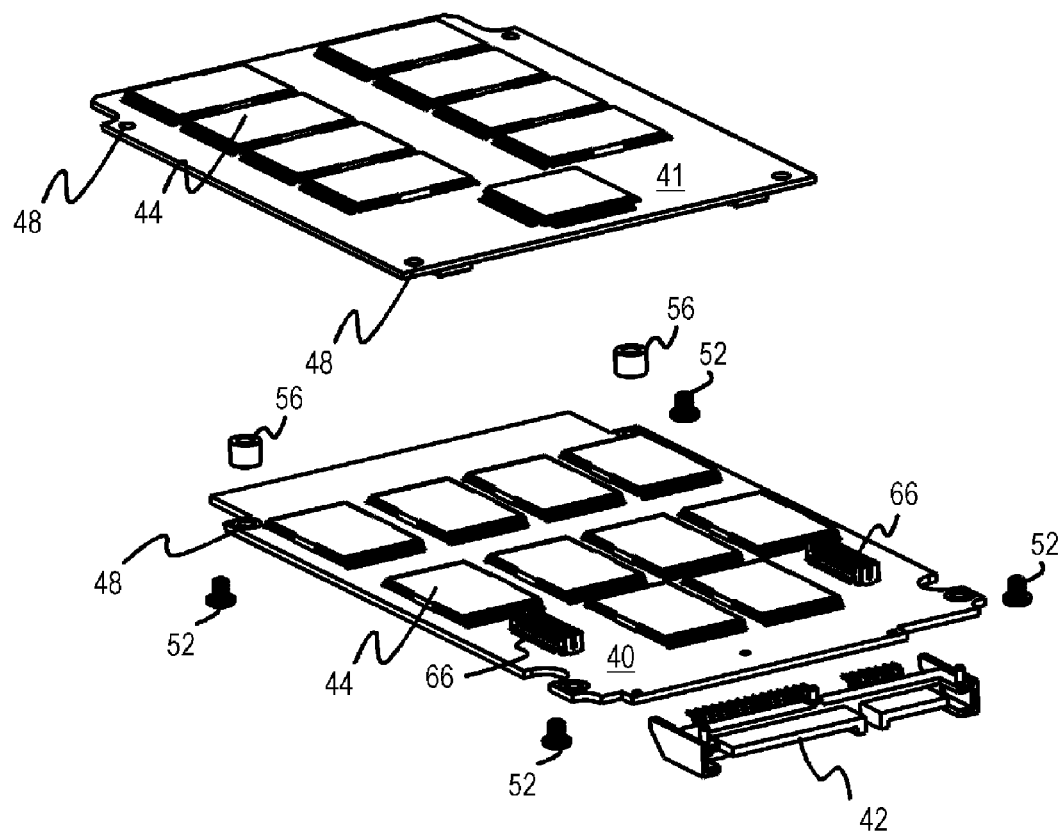
FIGS. 7A-C show dual PCBA's being assembled together before insertion into the upper case.
Figures 7B, 7C:
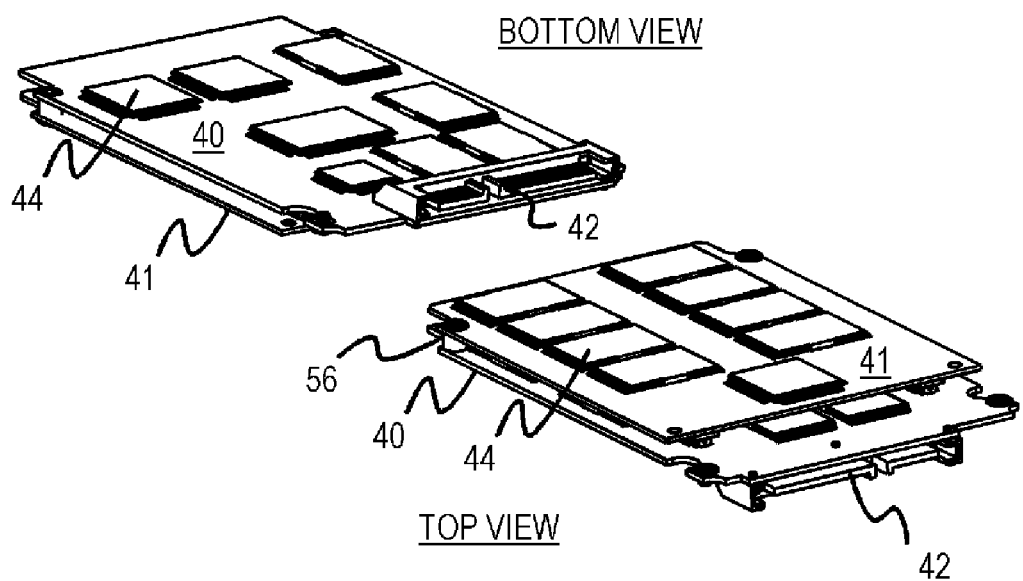

FIGS. 7A-C show dual PCBA's being assembled together before insertion into the upper case. In FIG. 7A, upper PCBA 41 and lower PCBA 40 are pre-assembled with chips 44 and other components wave-soldered onto their surfaces.

Standoffs 56 fit between PCBA 40, 41 to provide sufficient spacing between the circuit boards. Standoffs 56 can be cylindrical rings of metal or plastic that are aligned to the secondary axis and fit around screws 52. The length of screws 52 can be increased so that screws 52 fit through alignment holes 48 in both of PCBA 40, 41 and into plastic standoff pedestals inside upper case 20.

Two socket connectors 66 on the top surface of PCBA 40 receive matching pins on a connector (not shown) on the bottom surface of PCBA 41. Socket connectors 66 carry signals, ground, and power between PCBA 40, 41, and also provide spacing between PCBA 40, 41 near the front of the device. Connector 42 is soldered to lower PCBA 40.

PCBA 40, 41 are connected together by fitting pin connectors (not shown) on the bottom of upper PCBA 41 in socket connectors 66 on the upper surface of lower PCBA 40. Some force may be required. Standoffs 56 can then be fitted between PCBA 40, 41 over the alignment holes on the secondary axes. FIGS. 7B-C show the two PCBA's assembled together. The dual-PCBA assembly can next be fitted into upper case 20 as described earlier for the single-PCBA embodiments. The notches in the back of both PCBA 40, 41 align to allow dual-axis case-grounding pins 50 (not shown) to fit around both of the circuit boards.

Figure 8A:
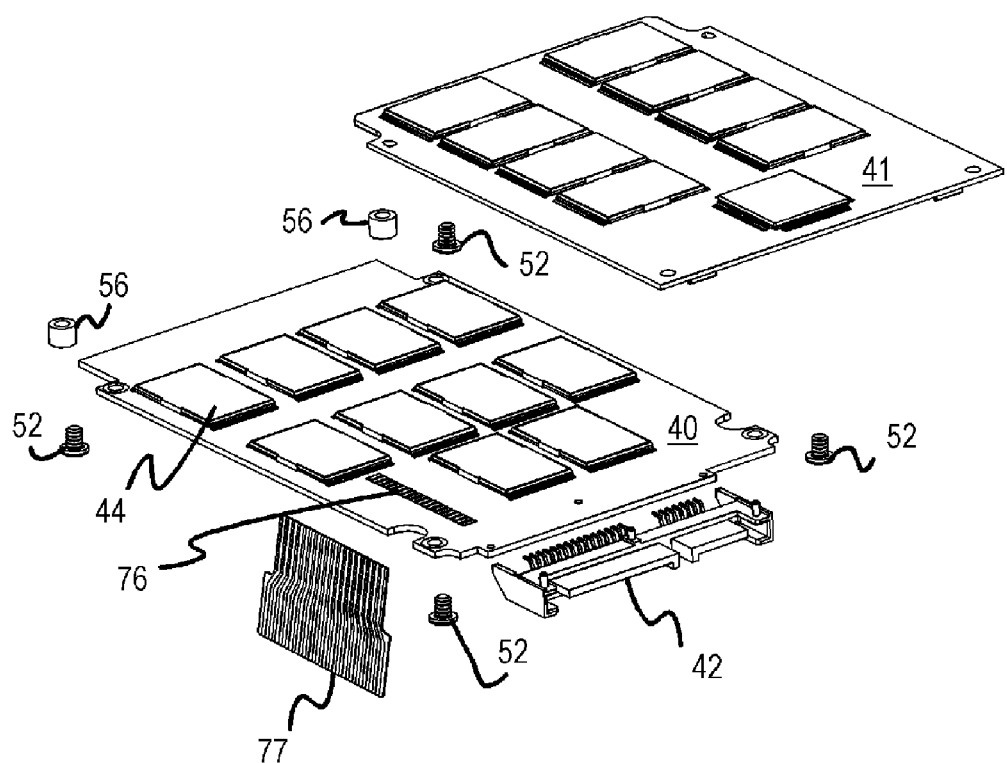
FIG. 8A shows a flexible cable that connects the dual PCBA's together.

In FIG. 8A, a flexible cable connects the dual PCBA's together. Rather than use socket connectors 66 and pins as described in FIG. 7, flex cable 77 connects signals in upper PCBA 41 to corresponding signals in lower PCBA 40. Solder pads 76 on the surface of lower PCBA 40 connect through traces to signals in lower PCBA 40. One end of flex cable 77 is soldered to solder pads 76, while the other end of flex cable 77 is soldered to similar pads (not shown) on the bottom surface of upper PCBA 41.

Standoffs 56 can then be fitted between PCBA 40, 41 over the alignment holes on the secondary axes. Flex cable 77 can provide sufficient spacing between PCBA 40, 41 near the front of the device, near external connector 42.

In FIGS. 8B-C, flexible circuit boards are used to form and connect dual PCBAs. Flexible board material 78 is a flexible multi-layer material with signal traces formed on it. Rather than use fiberglass or other rigid material in a traditional PCB, a flexible substrate is used and circuit traces are printed or formed on the flexible substrate.

Flexible board material 78 has one end portion that forms upper PCBA 41, and another end portion that forms lower PCBA 40. Chips 44 are solder to both portions of flexible board material 78, and connector 42 is soldered to the PCBA 40 portion of flexible board material 78.

After chips 44 and connector 42 are soldered to flexible board material 78, and alignment holes 48 are punched, drilled, or otherwise formed in flexible board material 78, the two end portions of flexible board material 78 are folded together to form the dual stack sub-assembly shown in the upper and lower views of FIG. 8B-C.

Figure 9A:
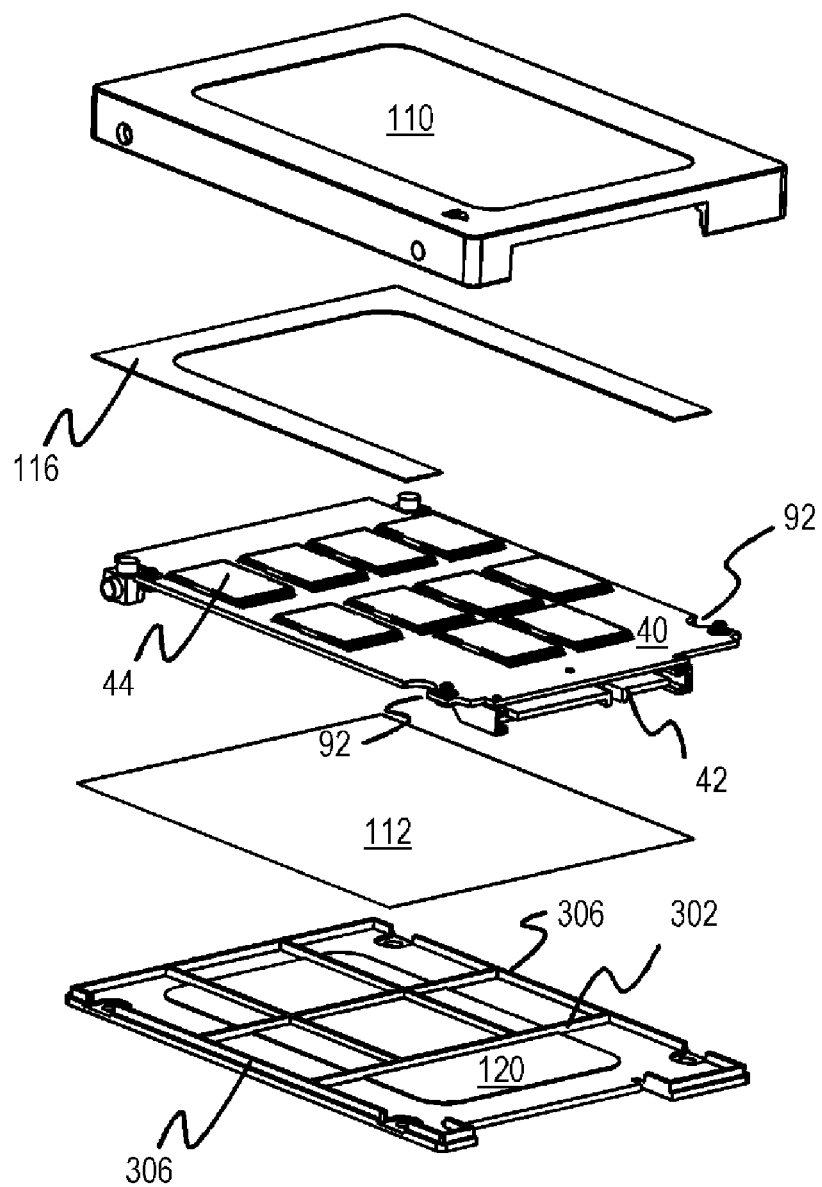
FIGS. 9A-C show a case-grounded flash-drive device made with a thermal-bond film method.
Figure 9B:
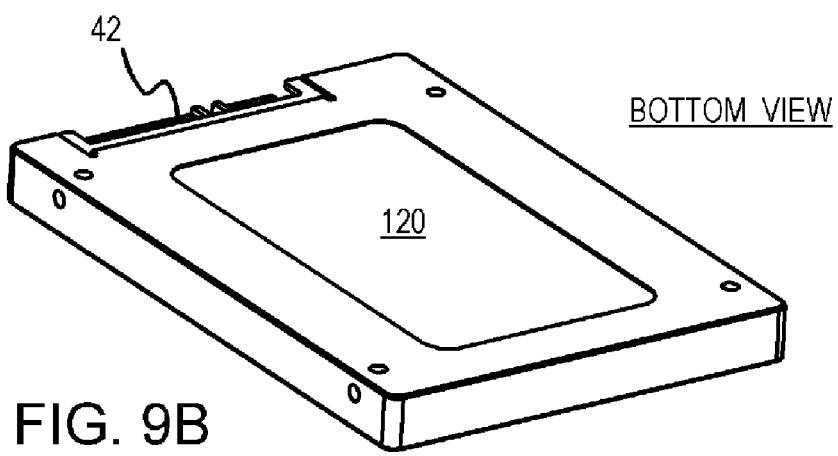
Figure 9C:
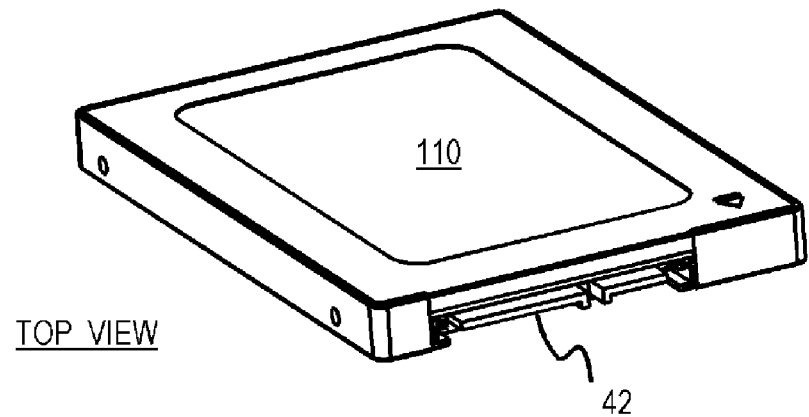

FIGS. 9A-C show a case-grounded flash-drive device made with a thermal-bond film method. Rather than use snaps or ultrasonic bonder edges, contact layers of adhesive are used to secure the upper and lower cases together to enclose the PCBA. Lower adhesive film 112 bonds lower case 120 to PCBA 40, while upper adhesive film 116 bonds lower case 120 to upper case 110.

During assembly, PCBA 40 is fitted inside upper case 110 as described earlier for upper case 20 in FIG. 4, and dual-axis case-grounding pins 50 are placed into case-grounding pin recess 38 (not shown) in upper case 110.

Lower adhesive film 112 is placed inside lower case 120, and upper adhesive film 116 is fitted around the edges of upper case 110. Upper case 110 with PCBA 40 fitted inside is lowered onto lower case 120, with upper adhesive film 116 between the cases. PCBA 40 makes contact with lower adhesive film 112, such as on the tops of flash-memory chips 44, when pressed against ribs 302 on lower case 120.

Lower case 120 has alignment rim 306 formed as a raised ridge on the topside of lower case 120. Alignment rim 306 fits inside the side walls of upper case 110 when lower case 120 is fitted into the sub-assembly of upper case 110 and PCBA 40. Upper adhesive film 116 has a U-shape to cover alignment rim 306. Upper adhesive film 116 is placed over alignment rim 306 before lower case 120 is inserted into the sidewalls of upper case 110. Adhesive from upper adhesive film 116 thus covers the connection of alignment rim 306 to upper case 110.

Upper adhesive film 116 and lower adhesive film 112 can be a film with a heat-activated adhesive, such as a thermal-bond film (for example, product number TBF668 produced by 3M). The adhesive is then compressed between upper case 110, lower case 120, and flash-memory chips 44, and the assembly is held in the compressed state using a fixture. The fixture is then passed through an oven maintained at a specified temperature to activate or cure the adhesive. The oven temperature can be at or lower than the maximum safe operating temperature for the memory module components.

Connector 42 can be made from a high-temperature material such as a liquid crystal polymer with 30% glass fiber filled, or nylon 66 with 20% glass fiber filled, etc.). This allows connector 42 to withstand the heating process. Thermal adhesives may allow for rework by re-heating the device and pulling apart the upper and lower cases.

FIG. 9B shows the bottom view and FIG. 9C shows the top view of the thermal-bonded flash-drive device.

Figure 10A:
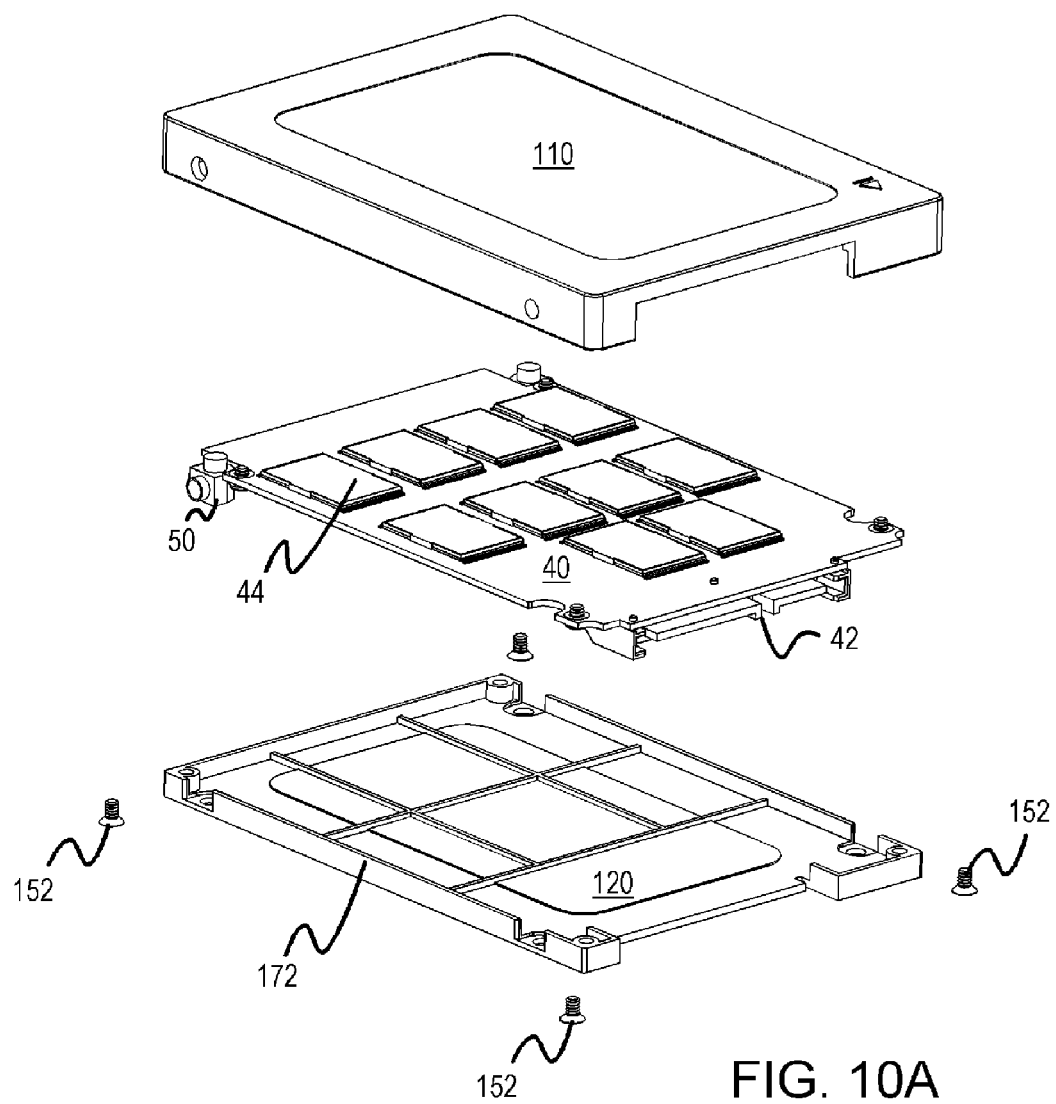
FIGS. 10A-C show a case-grounded flash-drive device made with a screw-together method.
Figures 10B, 10C:
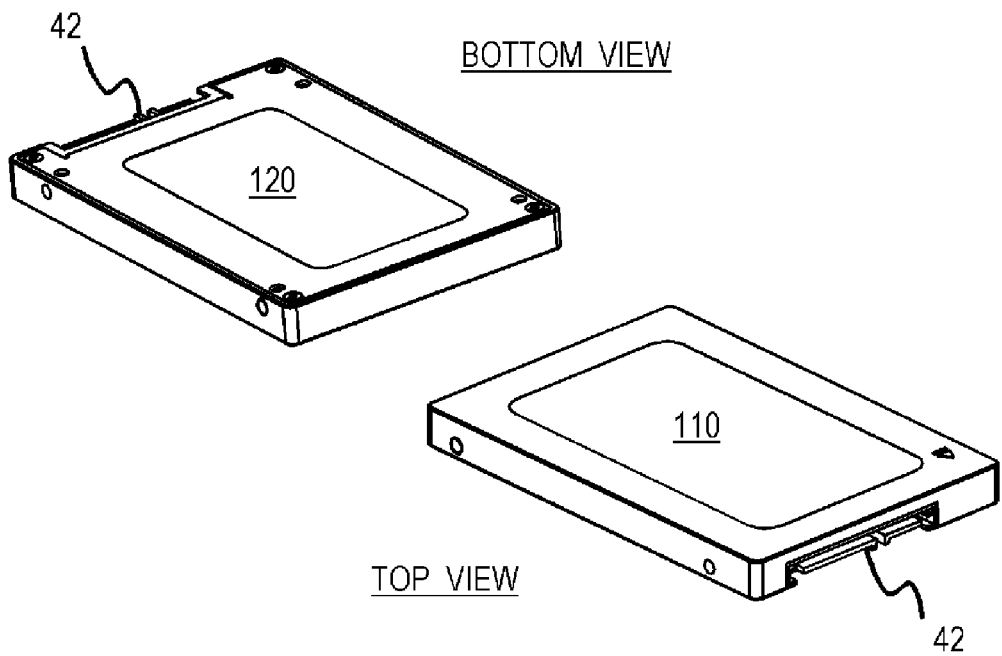

FIGS. 10A-C show a case-grounded flash-drive device made with a screw-together method. Screws 152 are elongated versions of screws 52 (FIG. 4) that pass through lower case 120, secondary axis washer 51 of dual-axis case-grounding pins 50, alignment holes 48 of PCBA 40, and into plastic standoff pedestals 34 of upper case 110. A second set of four screws could also be used for holding lower case 120 to upper case 110 if additional holes were provided. Edges 172 of lower case 120 fit inside the edges of upper case 110 before screws 152 are inserted and screwed down. FIG. 10B shows the bottom view and FIG. 10C shows the top view of the screwed-together flash-drive device.

ALTERNATE EMBODIMENTS

Several other embodiments are contemplated by the inventors. For example, additional dual-axis case-grounding pins 50 could be added, such as an additional 2 in the front of the device to have four dual-axis case-grounding pins 50. Secondary axis washer 51 could be below PCBA 40 as shown in FIG. 4, or could be above PCBA 40, as long as metal trace rings surround the matching side of alignment holes 48 to make electrical contact with secondary axis washer 51.

Rather than have a cylindrical tab on the bottom of dual-axis case-grounding pins 50 to fit into case-grounding pin recess 38, a square, triangular, hexagonal, or other shaped tab and hole could be used. Likewise, cutout hole 33 and cutout tab 53 could have other shapes. PCBA 41 may be asymmetric and may not match the outline of PCBA 40.

Additional standoffs 56 (FIG. 6) could be provide for the front screws, or the spacing may be sufficient without front standoffs. Second PCBA 41 may be shorter than PCBA 40, or may match the shape of PCBA 40.

While a connector for Serial AT-Attachment (SATA) has been described, other bus protocols and physical connectors could be substituted, such as small-computer system interface (SCSI), compact flash, integrated device electronics (IDE), and PCI Express, ExpressCard, Firewire (IEEE 1394), etc.

The upper and lower cases could be formed from metal in some embodiments, such as when using screws, or could be plastic, such as for ultrasonic bonding. Combinations of plastic and metal could be used. The form factor for the flash-drive device could be designed to approximate 2.5-inch hard disk drives, or a smaller form factor for 1.8-inch, 1.3-inch, 1.0-inch, or other sizes could be substituted.

Directional terms such as upper, lower, up, down, top, bottom, etc. are relative and changeable as the device is rotated, flipped over, etc. These terms are useful for describing the device but are not intended to be absolutes. Some embodiments may have chips or other components mounted on only one side of the circuit board, while other embodiments may have components mounted on both sides. In some embodiments the upper case could be smaller than the bottom case, or vice-versa.

An alternative process to the above heat-activated adhesive film is to use high viscosity adhesives. The adhesive can be applied to the case surface by manual or automatic using dispensing machine. After dispensing adhesives onto the case surface, immediately press the case against PCBA. A press fixture may be used to hold the case and PCBA in position. The curing time is about several minutes.

Various combinations of the processes may be used. For example, the adhesive films may be used with the screw-together method. Alignment sockets, tabs, or other forms may be added. Center lines or more numerous ridges may be added to stiffen the upper or lower cases. Various cosmetic features, decals, and indicia may be added.

Rather than mount packaged IC's onto the surfaces of the circuit board, unpackaged die may be mounted using die-bonding techniques. Using unpackaged die rather than packaged die may reduce the size and weight of the PCBA.

Snap-tabs with movable latching teeth or extensions or locking portions may also be used in many variations. Locking tabs and engagement slots may be used for the snaps and slots. Different thicknesses and dimensions can be substituted for the examples given. The number and arrangement of chips may vary.

Various design features such as supporting underside ribs or bumps can be added. A variety of materials may be used for the connector, circuit boards, metal pads, cases, etc. Plastic cases can have a variety of shapes and may partially or fully cover different parts of the circuit board and connector, and can form part of the connector itself. Metal covers rather than plastic may be used in some embodiments. Various features can have a variety of shapes and sizes. Oval, round, square, rectangular, trapezoidal, and other shapes may be used.

Rather than use the flash-drive device only for flash-memory storage, additional features may be added. For example, a music player may include a controller for playing audio from MP3 data stored in the flash memory. An audio jack may be added to the device to allow a user to plug in headphones to listen to the music. A wireless transmitter such as a BlueTooth transmitter may be added to the device to connect to wireless headphones rather than using the audio jack. Infrared transmitters such as for IrDA may also be added. A BlueTooth transceiver to a wireless mouse, PDA, keyboard, printer, digital camera, MP3 player, or other wireless device may also be added. The BlueTooth transceiver could replace the connector as the primary connector. A Bluetooth adapter device could have a connector, a RF (Radio Frequency) transceiver, a baseband controller, an antenna, a flash memory (EEPROM), a voltage regulator, a crystal, a LED (Light Emitted Diode), resistors, capacitors and inductors. These components may be mounted on the PCB before being enclosed into a plastic or metallic enclosure.

Figure 1:
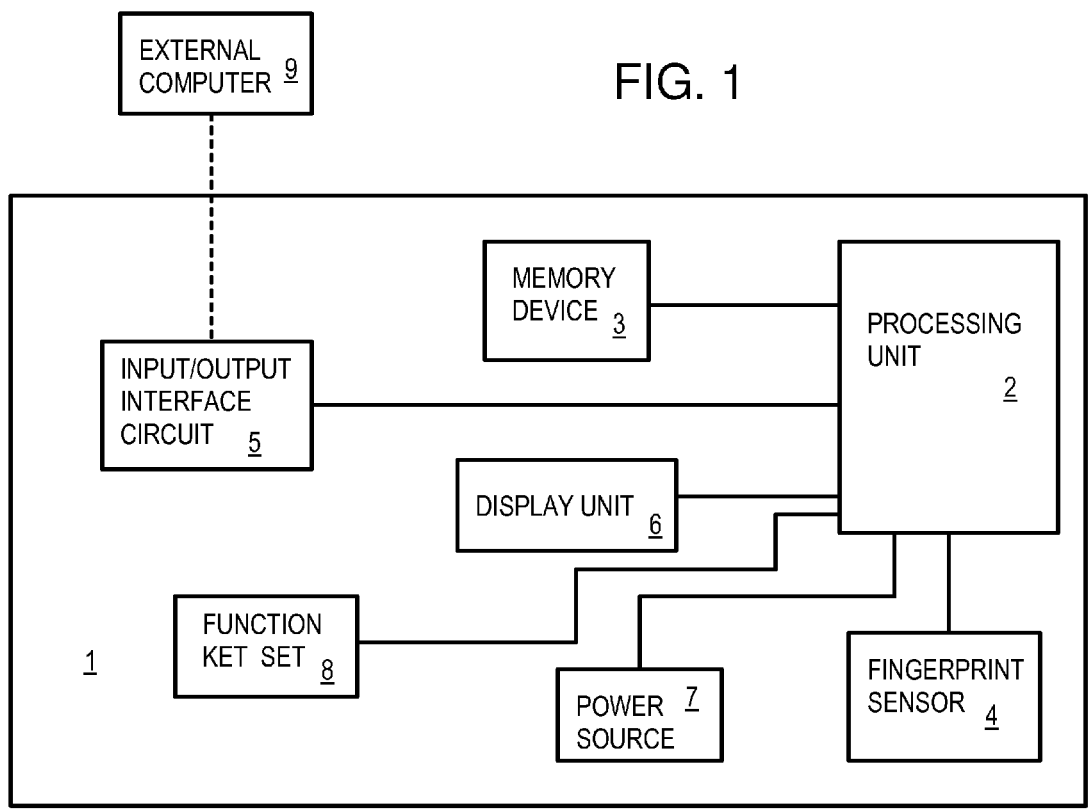
FIG. 1 is a schematic circuit block diagram illustrating an electronic data storage medium disclosed in the parent application.

A fingerprint scanner, display, keypad, power supply, or other accessories could be added to the flash-drive device with suitable changes to the casing to allow space and user access to these devices if needed. Alternately, the flash device may delete these components and just have input/output interface circuit 5, processing unit 2, and a flash memory device in the arrangement of FIG. 1. Power may be supplied through the connector. Input/output interface circuit 5 may be integrated with processing unit 2 as a controller chip.

An indicator lamp such as a light-emitting diode (LED) could be added to the PCBA. The case may have an opening, thinning of the plastic, or a lens to allow light from the indicator lamp to shine through the case. A light pipe or light channel could be added.

Any advantages and benefits described may not apply to all embodiments of the invention. When the word "means" is recited in a claim element, Applicant intends for the claim element to fall under 35 USC Sect. 112, paragraph 6. Often a label of one or more words precedes the word "means". The word or words preceding the word "means" is a label intended to ease referencing of claim elements and is not intended to convey a structural limitation. Such means-plus-function claims are intended to cover not only the structures described herein for performing the function and their structural equivalents, but also equivalent structures. For example, although a nail and a screw have different structures, they are equivalent structures since they both perform the function of fastening. Claims that do not use the word "means" are not intended to fall under 35 USC Sect. 112, paragraph 6. Signals are typically electronic signals, but may be optical signals such as can be carried over a fiber optic line.

The foregoing description of the embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

We claim:

1. A flash-memory drive comprising:
an upper case;
a lower case;
a printed-circuit board assembly (PCBA) that comprises:
a circuit board having wiring traces;
a plurality of flash-memory chips mounted to the circuit board;
a controller chip mounted to the circuit board, the controller chip having a input/output interface circuit for interfacing to an external computer, and a processing unit for accessing the plurality of flash-memory chips in response to commands from the external computer received by the input/output interface circuit; and
a connector mounted to the circuit board, for connecting the controller chip to the external computer;
wherein the upper case is attached to the lower case during assembly with the PCBA between the upper case and the lower case, with the connector passing through an opening between the upper case and the lower case, the upper and lower cases encapsulating the circuit board,
wherein the plurality of flash-memory chips are block-addressable and not randomly-addressable;
a conductive pin that contacts the upper case and contacts ground traces the circuit board, wherein the ground traces connect to a chassis ground through the connector when the connector is connected to the external computer;
wherein the conductive pin comprises a primary axis and a secondary axis that are substantially parallel to and offset from each other and substantially perpendicular to a plane of the circuit board;
wherein conductive pin contacts the upper case along the primary axis;
wherein the conductive pin contacts the circuit board around an alignment hole that is centered about the secondary axis,
whereby the conductive pin has primary and secondary axes.

2. The flash-memory drive of claim 1 wherein the conductive pin further comprises:
a primary body along the primary axis that contacts the upper case;
a secondary axis washer for contacting the ground traces around the alignment hole;
whereby the primary axis if for contacting the upper case and the secondary axis is for contacting the circuit board.

3. The flash-memory drive of claim 2 further comprising:
a case-grounding pin recess formed on the upper case along the primary axis, the case-grounding pin recess for receiving a portion of the primary body of the conductive pin; and
a plastic standoff pedestal formed on the upper case next to the case-grounding pin recess, the plastic standoff pedestal formed along the secondary axis and for supporting the circuit board.

4. The flash-memory drive of claim 3 further comprising:
a cutout hole formed in the upper case; and
a cutout tab on the conductive pin for inserting into the cutout hole of the upper case,
whereby the conductive pin is held to the upper case by the cutout tab fitting into the cutout hole.

5. The flash-memory drive of claim 3 further comprising:
a screw fastener, inserted into the alignment hole in the circuit board, through the secondary axis washer of the conductive pin, and into the plastic standoff pedestal, to fasten the circuit board to the upper case and to the conductive pin during assembly,
whereby the upper case, alignment hole, and plastic standoff pedestal are screwed together along the secondary axis.

6. The flash-memory drive of claim 5 wherein the screw fastener is further inserted through the lower case along the secondary axis,
whereby the upper case and lower case are screwed together.

7. The flash-memory drive of claim 1 further comprising:
a second circuit board that is substantially parallel to the circuit board;
standoffs between the circuit board and the second circuit board,
wherein a second plurality of flash-memory chips are mounted to the second circuit board, whereby a stack of circuit boards are encapsulated by the upper case and the lower case.

8. The flash-memory drive of claim 7 wherein the standoffs are along the secondary axis.

9. The flash-memory drive of claim 7 further comprising:
a first connector on the circuit board that mates with a second connector on the second circuit board.

10. The flash-memory drive of claim 7 further comprising:
a flex cable between the circuit board and the second circuit board.

11. The flash-memory drive of claim 7 wherein the circuit board is formed from a first portion of a flexible substrate;
wherein the second circuit board is formed from a second portion of a flexible substrate;
wherein the flexible substrate is folded between the first portion and the second portion to form the stack of circuit boards.

12. The flash-memory drive of claim 1 further comprising:
locking tabs formed on sidewalls of the lower case;
engagement slots formed on sidewalls of the upper case;
wherein the locking tabs snap into the engagement slots during assembly to lock the upper case into the lower case;
whereby the upper case and the lower case are assembled by a snap-together method.

13. The flash-memory drive of claim 1 further comprising:
an ultrasonic ridge formed on the lower case, for touching and melting into the upper case during assembly when the upper case is vibrated with ultrasonic energy with respect to the lower case,
whereby the upper case and the lower case are bonded by ultrasonic energy absorbed by the ultrasonic ridge.

14. The flash-memory drive of claim 1 further comprising:
an upper adhesive film disposed between the lower case and the upper case during assembly;
a lower adhesive film disposed between the PCBA and the lower case during assembly;
whereby the lower adhesive film bonds the lower case to the PCBA and the upper adhesive film bonds the lower case to the upper case during assembly.

15. The flash-memory drive of claim 14 wherein the upper adhesive film and the lower adhesive film are thermally activated by an elevated temperature.

16. The flash-memory drive of claim 1 wherein the connector is an integrated device electronics (IDE) connector or a small-computer system interface (SCSI) connector or a Serial AT-Attachment (SATA) connector, or a compact flash, PCI Express, ExpressCard, or Firewire (IEEE 1394) connector.

17. A flash-memory device comprising:
upper case means for partially encasing the flash-memory device;
lower case means for partially encasing the flash-memory device;
a printed-circuit board assembly (PCBA) that comprises:
circuit board means for connecting chips with wiring traces;
a plurality of flash-memory chip means for storing blocks of data, the plurality of flash-memory chip means being mounted to the circuit board means, wherein the plurality of flash-memory chip means are block-addressable and not randomly-addressable;
controller chip means, mounted to the circuit board means, for controlling access to the plurality of flash-memory chip means, the controller chip means comprising an input/output interface means for interfacing to an external computer, and processing unit means for accessing the plurality of flash-memory chip means in response to commands from the external computer received by the input/output interface means; and
connector means, mounted to the circuit board means, for connecting the controller chip means to the external computer;
dual-axis case-grounding pin means for conducting static-electric currents from the upper case means to the PCBA, the dual-axis case-grounding pin means contacting the upper case means at a primary axis, and making electrical contact to the circuit board means at a secondary axis, wherein the primary axis and the secondary axis are parallel to each other and perpendicular to a major surface of the circuit board means;
wherein the upper case means is attached to the lower case means during assembly with the PCBA between the upper case means and the lower case means, with the connector means passing through an opening between the upper case means and the lower case means.

18. The flash-memory device of claim 17 further comprising:
ultrasonic ridge means, formed on the upper case means, for touching the lower case means when ultrasonic energy is applied while pressing the upper case means into the lower case means, the ultrasonic ridge means for ultrasonically bonding the upper case means into the lower case means,
whereby the upper case means is ultrasonically bonded to the lower case means by the ultrasonic ridge means.

19. The flash-memory device of claim 17 further comprising:
locking tab means, formed on the lower case means, for locking the lower case means to the upper case means during assembly;
engagement slot means, formed on the upper case means, for receiving the locking tab means on the lower case means when the lower case means is inserted into the upper case means, the engagement slot means for engaging the locking tab means;
whereby the upper case means is snap-coupled to the lower case means by the locking tab means.

* * * * *